(12) United States Patent
Ludwig et al.

(10) Patent No.: US 9,654,574 B2
(45) Date of Patent: May 16, 2017

(54) METHODS AND APPARATUSES FOR DETERMINING A USER IDENTITY TOKEN FOR IDENTIFYING USER OF A COMMUNICATION NETWORK

(75) Inventors: Reiner Ludwig, Hürtgenwald (DE); Susana Fernandez Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 122 days.

(21) Appl. No.: 14/367,624

(22) PCT Filed: Dec. 23, 2011

(86) PCT No.: PCT/EP2011/074022
§ 371 (c)(1),
(2), (4) Date: Jun. 20, 2014

(87) PCT Pub. No.: WO2013/091735
PCT Pub. Date: Jun. 27, 2013

(65) Prior Publication Data
US 2015/0019703 A1 Jan. 15, 2015

(51) Int. Cl.
*G06F 15/173* (2006.01)
*H04L 29/08* (2006.01)
(Continued)

(52) U.S. Cl.
CPC ............ *H04L 67/22* (2013.01); *H04L 61/103* (2013.01); *H04W 12/02* (2013.01); *H04L 63/0807* (2013.01); *H04W 12/06* (2013.01)

(58) Field of Classification Search
CPC ... H04L 67/22; H04L 61/103; H04L 63/0807; H04W 12/06; H04W 12/02
(Continued)

(56) References Cited

U.S. PATENT DOCUMENTS 6,510,513 B1 * 1/2003 Danieli ........................ 713/156
6,553,219 B1 * 4/2003 Vilander et al. .............. 455/411
(Continued)

FOREIGN PATENT DOCUMENTS

WO 2010066295 A1 6/2010

OTHER PUBLICATIONS

Unknown, Author, "3GPP TS 23.203, V11.4.0 (Dec. 2011)", 3rd Generation Partnership Project; Technical Specification Group Services and System Aspects; Policy and charging control architecture (Release 11), Dec. 2011, pp. 1-167.
(Continued)

*Primary Examiner* — Michael Y Won
(74) *Attorney, Agent, or Firm* — Murphy, Bilak & Homiller, PLLC (57) ABSTRACT

User identity token for identifying a user of a communication network A first node (13), e.g., a policy controller of a communication network, receives a request (101) from a second node (15), e.g., an application server for providing a service in the communication network. The request (101) includes a transport address assigned to a user of the communication network. Further, the first node (13) accesses mapping data (31) relating the transport address to a subscription identity of the user and determines a user identity token which is mapped to the subscription identity of the user and masks the subscription identity. The first node (13) then sends a response to the second node (15). The response (102) includes the user identity token.

20 Claims, 9 Drawing Sheets (51) Int. Cl.
  *H04W 12/02* (2009.01)
  *H04L 29/12* (2006.01)
  *H04L 29/06* (2006.01)
  *H04W 12/06* (2009.01)

(58) Field of Classification Search
  USPC ............... 709/203, 217, 225, 229, 227, 230
  See application file for complete search history.

(56) References Cited

U.S. PATENT DOCUMENTS

| | | | |
|---|---|---|---|
| 7,672,998 B1* | 3/2010 | Haskins et al. | 709/206 |
| 7,779,021 B1* | 8/2010 | Smith | G06F 11/3476 707/760 |
| 7,804,774 B2* | 9/2010 | Yang | H04L 63/0227 370/229 |
| 8,291,468 B1* | 10/2012 | Chickering | 726/1 |
| 8,819,803 B1* | 8/2014 | Richards | H04L 9/3213 380/258 |
| 9,419,841 B1* | 8/2016 | Kozolchyk | H04L 29/06 |
| 2002/0007351 A1* | 1/2002 | Hillegass | G06Q 20/06 705/59 |
| 2004/0166874 A1* | 8/2004 | Asokan et al. | 455/456.1 |
| 2004/0205243 A1* | 10/2004 | Hurvig et al. | 709/245 |
| 2006/0026421 A1* | 2/2006 | Gasparini | G06F 21/33 713/156 |
| 2007/0197226 A1* | 8/2007 | Zhu | 455/445 |
| 2008/0127320 A1* | 5/2008 | De Lutiis et al. | 726/9 |
| 2010/0036711 A1* | 2/2010 | Shenfield et al. | 705/10 |
| 2010/0049693 A1* | 2/2010 | Cao et al. | 707/2 |
| 2011/0105154 A1* | 5/2011 | Kim | 455/458 |
| 2011/0202991 A1* | 8/2011 | Paquin et al. | 726/9 |
| 2012/0117590 A1* | 5/2012 | Agnihotri | H04N 21/25816 725/30 |
| 2012/0206317 A1* | 8/2012 | Wong | G06F 21/10 345/1.1 |
| 2013/0039340 A1* | 2/2013 | Lappetelainen et al. | 370/331 |
| 2013/0103834 A1* | 4/2013 | Dzerve et al. | 709/225 |
| 2013/0104202 A1* | 4/2013 | Yin | G06F 21/42 726/5 |
| 2013/0152185 A1* | 6/2013 | Singh | G06F 21/35 726/9 |
| 2013/0188515 A1* | 7/2013 | Pinheiro et al. | 370/254 |
| 2013/0291071 A1* | 10/2013 | Blom et al. | 726/4 |
| 2014/0033292 A1* | 1/2014 | Moore | G06F 21/35 726/9 |
| 2015/0126184 A1* | 5/2015 | Holtmanns et al. | 455/432.3 |

OTHER PUBLICATIONS

Unknown, Author, "3GPP TS 29.213, V8.1.1 (Oct. 2008)", 3rd Generation Partnership Project; Technical Specification Group Core Network and Terminals; Policy and Charging Control signalling flows and QoS parameter mapping; (Release 8), Oct. 2008, pp. 1-88.

* cited by examiner

| SUBSCRIPTION ID | TRANSPORT ADDRESS | USER TOKEN |
|---|---|---|
| MSISDN 1 | xxx.xxx.xxx.xxx | TOKEN(MSISDN 1) |
| MSISDN 2 | yyy.yyy.yyy.yyy | TOKEN(MSISDN 2) |
| MSISDN 3 | zzz.zzz.zzz.zzz | TOKEN(MSISDN 3) |

METHODS AND APPARATUSES FOR DETERMINING A USER IDENTITY TOKEN FOR IDENTIFYING USER OF A COMMUNICATION NETWORK

TECHNICAL FIELD

The present invention relates to methods for user identity handling in a communication network and identification of a user of a communication network, and to corresponding devices.

BACKGROUND

In communication networks, a user may be identified by a subscription identity. The subscription identity may for example be used for authenticating the user in the communication network. One example of a subscription identity is the MSISDN (Mobile Subscriber Integrated Services Digital Network Number) as used in 3GPP (Third Generation Partnership Project) mobile networks and other types of mobile networks. The subscription identity is assigned to the user on a long-term basis, e.g., for the duration of a contract agreement between the user and an operator of the communication network.

Further, a user may also be identified on the basis of a transport address, e.g., an IP (Internet Protocol) address, as used for transmitting data to or from the user. Typically, if the user uses a certain user equipment (UE) for connecting to the communication network, such a transport address may be assigned to the UE by the communication network. As compared to the subscription identity, the assignment of the transport address is on a short-term basis, e.g., for the duration of data communication between the user and the communication network. Also, the transport access may change when the user disconnects from the communication network and later connects or attaches again.

In some scenarios, a node involved in data communication with the user may be aware of the transport address, but not of the subscription identity of the user. One example of such scenarios can be found in the PCC (Policy and Charging Control) architecture as defined in 3GPP Technical Specification (TS) 23.203. In this case, an Application Function (AF) may be a third-party node offering a certain service to the users of the mobile network. For transmitting service-related data to and from the UE of the user, the AF is aware of the IP address assigned by the mobile network to the user. However, for privacy reasons, the third-party AF may not be aware of the subscription identity of the user. For enabling the control of Quality of Service (QoS), the AF may communicate with a Policy and Charging Rules Function (PCRF) of the mobile network. In communication with the PCRF, the AF may use the IP address for identifying the user. This IP address is assigned to the user on a temporary basis. For example, if the UE of the user detaches from the mobile network at some time, it will typically loose the IP address assigned by the mobile network. The IP address may then be assigned to some other user. When the UE reattaches to the mobile network, it may be assigned a new IP address which may be different from the previous one.

In view of its above-described temporary character, the IP address assigned to the user by the mobile network has some limitations when used by the AF for identifying the associated user. For example, monitoring usage of the service by the user on a long-term basis would be problematic since the user's UE may frequently detach from the mobile network and reattach to the mobile network and therefore use different IP addresses in communication with the AF.

Accordingly, there is a need for techniques which allow for more accurate identification of a user of a communication network while at the same time taken into account privacy aspects.

SUMMARY

According to an embodiment of the invention, a method for user identity handling in a communication network is provided. According to the method, a node receives a request including a transport address assigned to a user of the communication network. The node may be a policy controller of the communication network. Further, the node accesses mapping data relating the transport address to a subscription identity of the user. The node then determines a user identity token which is mapped to the subscription identity of the user and masks the subscription identity and responds to the request by sending a response which includes the user identity token.

According to a further embodiment of the invention, a method for identifying a user of a communication network is provided. According to the method, a node sends a request which includes a transport address assigned to a user of the communication network. The node may be an application server for providing a service in the communication network. The node then receives a response to the request. The response includes a user identity token which is mapped to a subscription identity of the user and masks the subscription identity. The node identifies the user on the basis of the user identity token.

According to a further embodiment of the invention, a node is provided. The node may be a policy controller of the communication network. The node comprises an interface for communication with at least one further node and a processor. The processor is configured to receive, via the interface, a request including a transport address assigned to a user of a communication network. Further, the processor is configured to access mapping data relating the transport address to a subscription identity of the user and to determine a user identity token which is mapped to the subscription identity of the user and masks the subscription identity. Moreover, the processor is configured to send, via the interface, a response to the request. The response includes the user identity token.

According to a further embodiment of the invention, a node is provided. The node may be an application server for providing a service in the communication network. The node comprises an interface for communication with a node of a communication network and a processor. The processor is configured to send, via the interface, a request including a transport address assigned to a user of the communication network and receive, via the interface, a response to the request. The response includes a user identity token which is mapped to a subscription identity of the user and masks the subscription identity. Further, the processor is configured to identify the user on the basis of the user identity token.

According to a further embodiment of the invention, a system is provided. The system comprises a first node and a second node. The first node may be a policy controller of the communication network and the second node may be an application server for providing a service in the communication network. The first node is configured to receive a request from the second node. The request includes a transport address assigned to a user of the communication network. Further, the first node is configured to access mapping data relating the transport address to a subscription identity of the user and to determine a user identity token which is mapped to the subscription identity of the user and masks the subscription identity. Moreover, the first node is configured to send a response including the user identity token to the second node.

DETAILED DESCRIPTION OF EMBODIMENTS

In the following, the invention will be explained in more detail by referring to exemplary embodiments and to the accompanying drawings. The illustrated embodiments relate to concepts of handling the identity of a user of a communication network, e.g., a mobile network according to the 3GPP Technical Specifications (TSs). However, it is to be understood that the illustrated concepts may be applied in other types of communication network as well. The concepts may be used to provide a node with information for identifying the user without revealing a subscription identity of the user as used in the communication network. For this purpose, a user identity token is used.

Figure 1:
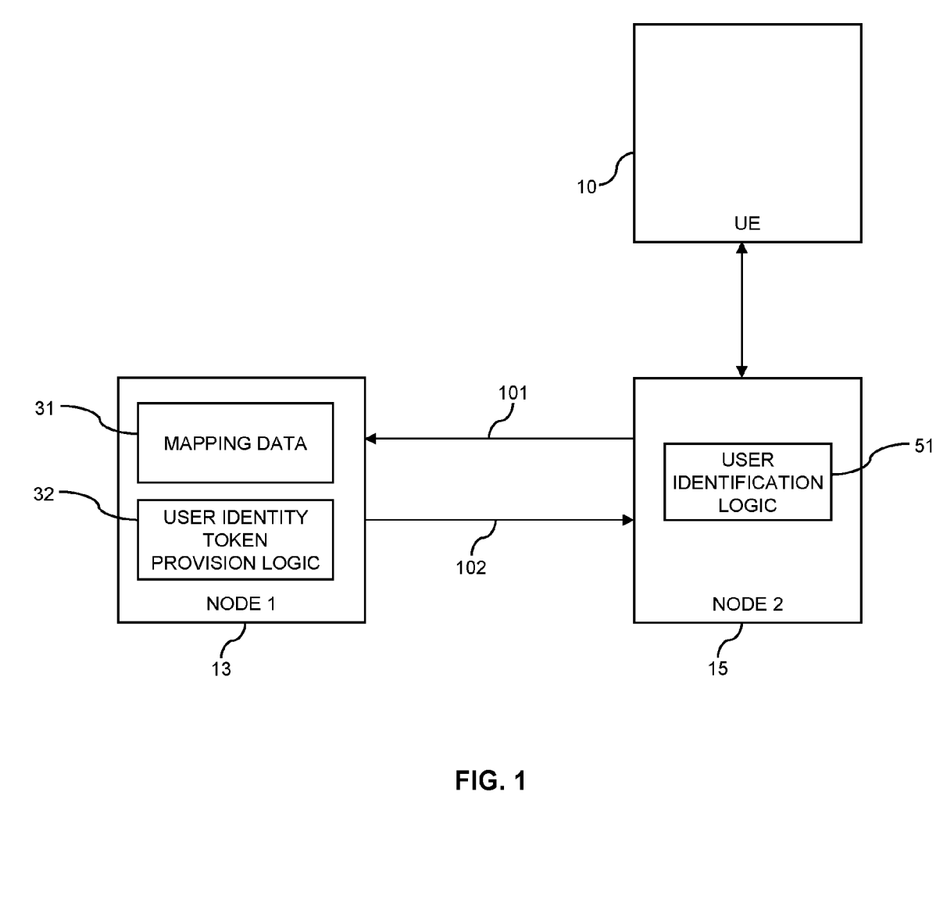
FIG. 1 schematically illustrates nodes implementing concepts according to an embodiment of the invention.

FIG. 1 schematically illustrates by way of example a system including a first node 13 and a second node 15 implementing user identity handling on the basis of the user identity token. In the illustrated example, the second node 15 communicates with a UE 10, e.g., for exchanging data of a session established between the UE 10 and the second node 15. This is accomplished using resources of the communication network, e.g., a radio connection or wire-based broadband connection between the UE 10 and the communication network. The first node 13 may be a node of the communication network which is responsible for controlling resources of the communication network which are to be used for the session, e.g., a policy controller. For example, the first node 13 may control the resources for providing a certain QoS. For this purpose, the first node 13 may be aware of a subscription identity corresponding to the UE 10, e.g., in terms of an MSISDN, an IMSI (International Mobile Subscriber Identity), an SIP URI (Session Initiation Protocol Uniform Resource Identifier), or an NAI (Network Access Identifier). This subscription identity may be assigned to a user of the UE 10 on a long-term basis, e.g., for the duration of a contract agreement between the user and an operator of the communication network. The subscription identifier may therefore be regarded as a permanent identifier of the user. In the following, the terms "UE of the user" and UE will be regarded as synonymous.

The second node 15 may be a third-party node to which the subscription identity corresponding to the UE 10 should not be revealed, e.g., for privacy reasons. That is to say, the second node 15 may be operated by another operator than the communication network to which the first node 13 belongs, e.g., by another legal entity. For example, the second node may be a third-party application server for providing a service in the communication network. The second node 15 may however be aware of a transport address assigned to the UE 10 by the communication network, e.g., in the form of an IP address. This transport address may be used for routing service-related data between the second node 15 and the UE 10. The second node 15 may also use the transport address assigned to the UE 10 for identifying the UE 10 or its user in communication with the first node 30. In some scenarios, the transport address may be one of multiple transport addresses simultaneously assigned to the UE 10, e.g., one of multiple IP addresses assigned to the UE 10.

As further illustrated, the first node 13 has access to mapping data 31 relating the transport address assigned to the UE 10 to the subscription identity of the user. In the illustrated example, the mapping data 31 are illustrated as being stored by the first node 13. However, the mapping data 31 could also be stored at some other location which is accessible to the first node 13.

In the illustrated example, in order to enable efficient identification of the user of the UE 10 by the second node 15, the first node 13 is provided with a user identity token provision logic 32. The user identity token provision logic 32 is used to provide a user identity token to the second node 15. To determine the user identity token, the first node 13 accesses the mapping data 31. For example, the mapping data 31 may store the user identity token in association with the subscription identity of the user or may store a mapping rule for deriving the user identity token, e.g., a hash function or parameters of a hash function. The provision of the user identity token is accomplished in response to receiving a request 101 from the second node 15. The request 101 includes the transport address assigned to the UE 10 and its user. The first node 13 includes the user identity token in a response 102 to the request 101, which response 102 is then transmitted to the second node 15. The request 101 may for example be a request for authorizing the control of resources for the session between the UE 10 and the second node 15, e.g., in accordance with a Diameter based protocol.

The user identity token is an identifier which is mapped to the subscription identity of the user without revealing the subscription identity itself. That is to say, the user identity token masks the subscription identity of the user. For example, the user identity token may include or consist of a hash value of the subscription identity. The user identity token could also include or consist of a randomized value which is mapped to the subscription identity. The user identity token may also include or consist of a combination of a hash value of the subscription identity and a randomized value which is mapped to the subscription identity. In each case, determination of the subscription identity from the user identity token alone is not possible. In some scenarios, there may be a one-to-one correspondence between the user identity token and the subscription identity. In other scenarios, it may be tolerable that the same user identity token can sometimes be mapped to different subscription identities so that there is some degree of ambiguity in the relation of user identity token to subscription identity. Such ambiguity may even be desirable in view of privacy.

On the basis of the user identity token, the second node 15 may identify the user of the UE 10. For this purpose, the second node 15 may be provided with a correspondingly configured user identification logic 51. The identification of the user may be accomplished on a longer timescale than the timescale on which the same transport address is assigned to the UE 10, e.g., across multiple sessions using different transport addresses of the UE 10. For example, the second node may apply the same user-specific procedure to multiple sessions of the user identified by the user identity token, e.g., provide a user specific counter or timer. This may for example be used for monitoring service usage by the user or otherwise maintain status information of the user.

In order to improve privacy, the user identity token mapped to the subscription identity of the user may be regularly replaced. For example, the first node 13 could newly generate the user identity token mapped to the subscription identity of the user. The first node 13 could also modify the existing user identity token or modify a mapping rule relating the user identity token to the subscription identity, e.g., by using a different hash function for generating the user identity token from the subscription identity. Replacing of the user identity token may be accomplished according to a certain time schedule, e.g., once per month or once per year. Alternatively or in addition, replacing of the user identity token could also be triggered by certain events, e.g., a corresponding request from the second node 15 or after the user identity token was provided for a specified number of times. In some scenarios, the first node 13 may inform the second node 15 of the replacement, e.g., in order to allow the second node 15 to link the new user identity token to the existing one.

Figure 2:
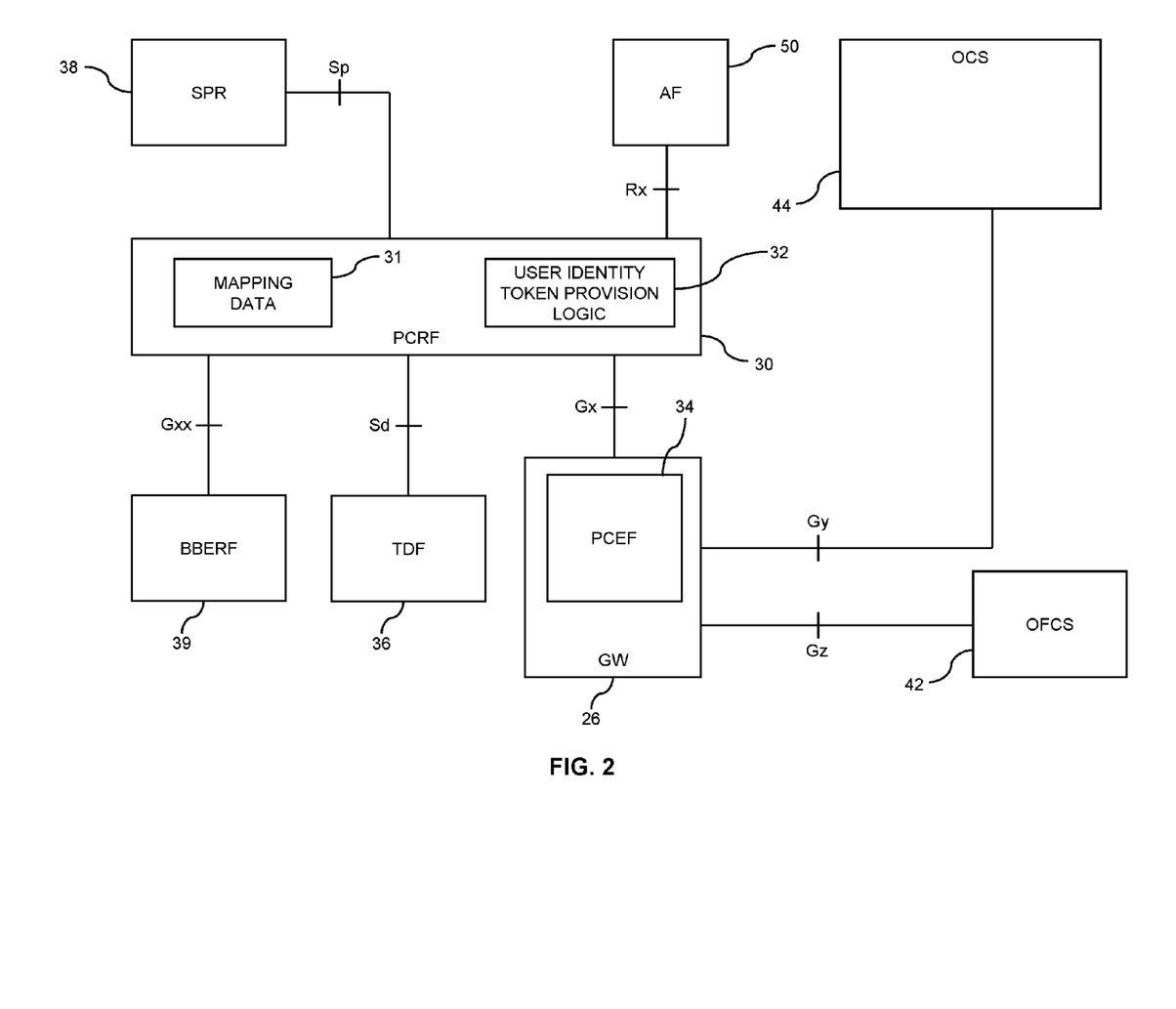
FIG. 2 schematically illustrates a PCC architecture according to an embodiment of the invention.

FIG. 2 further illustrates implementation of the above concepts in a mobile network using a PCC architecture according to 3GPP TS 23.203. As illustrated, the PCC architecture includes a gateway (GW) 26 for providing a packet data connection to a UE (not illustrated in FIG. 2), an AF 50, and a policy controller in the form of a PCRF 30. The PCRF 30 may correspond to the first node 13 of FIG. 1, and the AF 50 may correspond to the second node 15 of FIG. 1. Accordingly, the PCRF 30 may be equipped with the user identity token provision logic 32, and the AF 50 may be equipped with the user identification logic 51 (not illustrated in FIG. 1). As further illustrated, the PCRF 30 has access to the mapping data 31 relating the transport address assigned to the UE to the subscription identity of the user of the UE. In the following, it will be assumed that the transport address is an IP address and that the subscription identity is an MSISDN or an IMSI. Here, it should be noted that the MSISDN and IMSI are typically associated with a Subscriber Identity Module (SIM) of the user, and this SIM is mounted in the user's UE. Nonetheless, it is to be understood that a subscription identity of the user is at the same time also associated with the user's UE and that the transport address assigned to the UE is at the same time also assigned to the user of the UE. Again, the mapping data 31 are illustrated as being stored by the PCRF 30. However, the mapping data 31 could also be stored at some other location which is accessible to the PCRF 30.

As further illustrated, the PCC architecture also includes a repository 38 and a Policy Control Enforcement Function (PCEF) 34. In the illustrated example, the repository 38 corresponds to a Subscriber Profile Repository (SPR). However, it is to be understood that other types of repository could be used as well, e.g., a User Data Repository (UDR).

As illustrated, the PCC architecture may also include a Traffic Detection Function (TDF) 36, a Bearer Binding and Event Reporting Function (BBERF) 39, an Offline Charging System (OFCS) 42, and/or an Online Charging System (OCS) 44.

The PCRF 30 is configured to perform policy control decision and/or flow based charging control. The PCRF 30 may provide network control regarding detection of service data flows detection, gating, QoS, and/or flow based charging towards the PCEF 34. For this purpose, the PCRF 30 may signal PCC rules to the PCEF 34. The PCEF 34 may be configured to perform service data flow detection, policy enforcement and flow based charging functionalities, which is typically accomplished by applying the PCC rules as signaled by the PCRF 30. Further, the PCEF 34 may also implement functionalities of packet inspection, such as Deep Packet Inspection (DPI), and service classification. In this way data packets may be classified according to PCC rules defined in the PCEF 34 and be assigned to a certain service.

In the illustrated implementation, the PCEF 34 may be responsible for enforcing policies with respect to authentication of subscribers, authorization to access and services, and accounting and mobility. The PCRF 30 may be responsible for managing individual policies defining network, application, and subscriber conditions that must be met in order to successfully deliver a service or maintain the QoS of a given service. The repository 38, which may be a standalone database or integrated into an existing subscriber database such as a Home Subscriber Server (HSS), may include information such as entitlements, rate plans, etc. The repository 38 may provide subscription data such as a subscriber's allowed services, a pre-emption priority for each allowed service, information on a subscriber's QoS parameters, e.g., a subscribed guaranteed bandwidth QoS, a subscriber's charging related information, e.g., location information relevant for charging, a subscriber category, e.g., whether the subscriber is a gold user to be provided with a high QoS or a silver or bronze user to be provided with lower QoS.

The AF 50 is an element offering one or more services to users of the mobile network, e.g., delivery of content or acceleration of content delivery. These services can be delivered in a network layer which is different from a network layer in which the service was requested. For example, the service can be requested in the signaling layer and delivered in the transport layer. The AF 50 typically communicates with the PCRF 30 to transfer session information, e.g., description of data to be delivered in the transport layer. This may also involve authorization of a session by the PCRF 30 upon request from the AF 50. In the illustrated implementation, it is assumed that the AF 50 is implemented by a third-party application server.

As further illustrated in FIG. 2, the nodes of the PCC architecture are coupled to each other by interfaces or reference points termed as Gx, Gxx, Gy, Gz, Sp, and Rx. The Gx reference point resides between the PCRF 30 and the gateway 26, and allows for communication between the PCRF 30 and the PCEF 34. The Gxx reference point resides between the PCRF 30 and the BBERF 39. The Gy reference point resides between the gateway 26 and the OCS 44. The Gz reference point resides between the gateway 26 and the OFCS 42. The Rx reference point resides between the AF 50 and the PCRF 30. The Sp reference point resides between the repository 38 and the PCRF 30. The Sd reference point resides between the TDF 36 and the PCRF 30. Details concerning the implementation of these interfaces can be found in the 3GPP TSs, e.g., 3GPP TS 23.203 and 3GPP TS 29.212, 29.213 and 29.214. It should be noted that different interfaces could be used in other implementations.

For implementing the above concepts of user identification on the basis of the user identity token, the AF 50 may send a request including the IP address of the UE to the PCRF 30. This request may for example be an AA-Request (AAR) command of the Rx interface protocol. The PCRF 30 may then access the mapping data 31 to determine the user identity token and send a response including the user identity token to the AF 50. This response may for example be an AA-Answer (AAA) command of the Rx interface protocol. On the basis of the received user identity token, the AF 50 may then identify the user, e.g., in order to perform user specific procedures such as usage monitoring or the like. Also, a user-specific counter or timer could be provided in the AF 50. A user-specific timer could for example be useful if there is a time-limit for usage of a certain service by the user. A user-specific counter could for example be useful if there is a limit for the number of service accesses by the user. This may be accomplished irrespective of changes in the IP address assigned to the UE.

Figure 3:
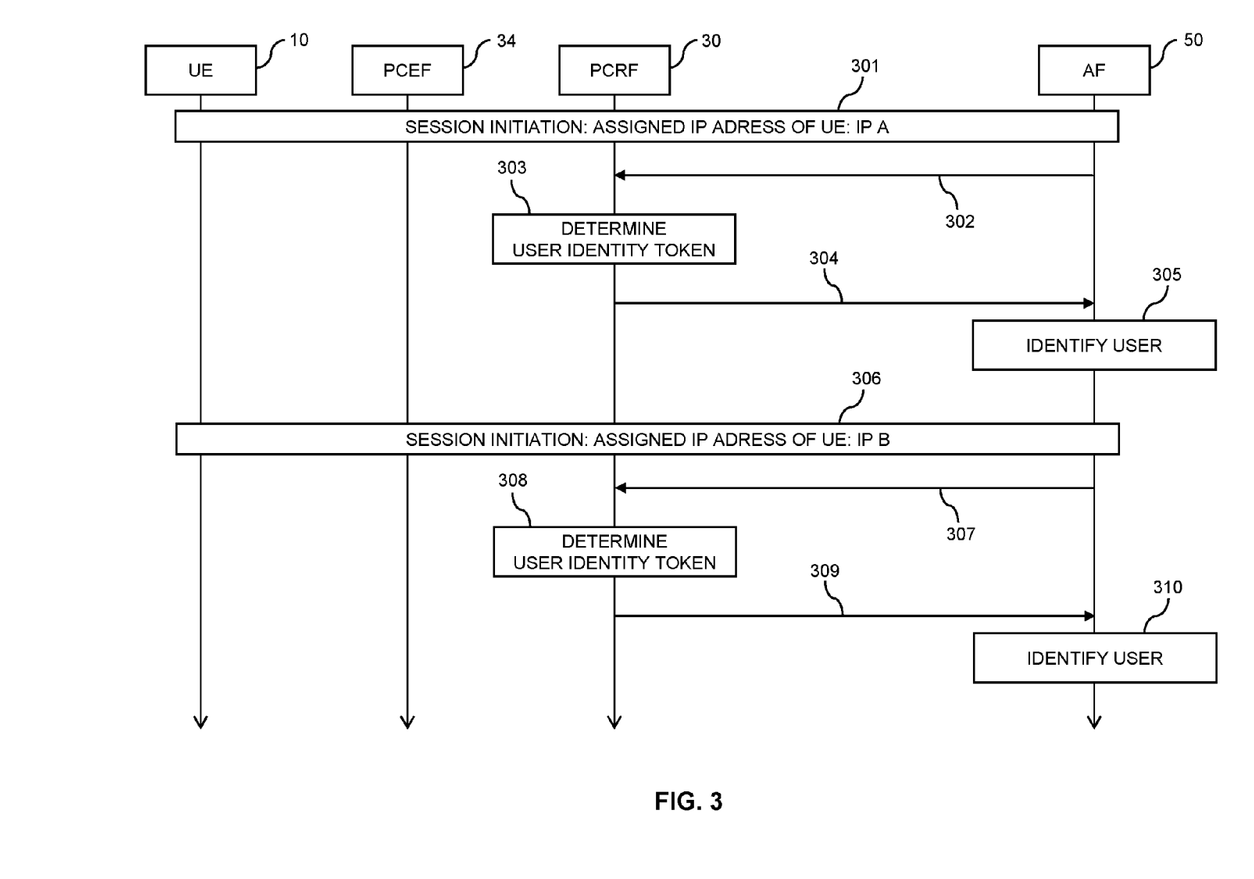
FIG. 3 shows a signaling diagram for illustrating a process according to an embodiment of the invention.

FIG. 3 shows a signaling diagram for illustrating an examplary process of user identity handling as for example applicable in the PCC architecture of FIG. 2. The illustrated process involves the UE 10, the PCEF 34, the PCRF 30, and the AF 50.

In the process of FIG. 3, a session between the UE 10 and the AF 50 is initiated at step 301. For this session, a first IP address ("IP A") is assigned to the UE 10. The PCEF 34 reports the assigned IP address to the PCRF 30. The IP address may be assigned to the UE 10 when establishing the session. However, the IP address may also be assigned to the UE 10 already before establishing the session between the UE 10 and the AF 50, e.g., when the UE 10 attaches to the mobile network and receives IP connectivity. For example, the IP address may be assigned to the UE 10 when it receives IP connectivity, and the UE 10 may send the IP address to the AF 50, e.g., when the UE 10 requests establishment of the session.

As illustrated, the AF 50 sends a request 302 to the PCRF 30. This may for example be a request for authorizing a service corresponding to the session by the PCRF 30. The request 302 may for example be an AAR command of the Rx interface protocol. The request 302 may also include session information corresponding to the first session and the IP address assigned to the UE 10, e.g., in corresponding Attribute Value Pairs (AVPs).

The PCRF 30 receives the request 302 and, as illustrated by step 303, determines the user identity token corresponding to the IP address of the UE 10 as included in the request 302. For this purpose, the PCRF 30 accesses the mapping data 31 relating the IP address of the UE 10 to the subscription identity of the user and determines the user identity token which is mapped to the subscription identity.

The PCRF 30 then sends a response 304 to the AF 50. The response 304 includes the user identity token as determined at step 303. The response 304 may for example be an AAA command of the Rx interface protocol. The response 304 may also include an authorization result. The user identity token may be included in a corresponding AVP of the response 304.

As illustrated by step 305, the AF 50 may then identify the user on the basis of the received user identity token. Since the user identity token does not reveal the subscription identity of the user, this may be accomplished without compromising privacy of the user.

At a later point of time, a second session between the UE 10 and the AF 50 is initiated at step 306. For this session, a second IP address ("IP B") is assigned to the UE 10. This may for example be due to the UE 10 temporarily losing IP connectivity to the mobile network. Further, the second IP address could be another IP address of multiple IP addresses simultaneously assigned to the UE 10. The PCEF 34 may again report the assigned IP address to the PCRF 30. The second IP address is assumed to be different from the first IP address.

As illustrated, the AF 50 sends a further request 307 to the PCRF 30. As the request 302, this may for example be a request for authorizing a service corresponding to the second session by the PCRF 30, e.g., an AAR command of the Rx interface protocol. The further request 307 may also include session information corresponding to the second session and the IP address now assigned to the UE 10, e.g., in corresponding Attribute Value Pairs (AVPs).

The PCRF 30 receives the further request 307 and, as illustrated by step 308, determines the user identity token corresponding to the IP address of the UE 10 as included in the request 307. For this purpose, the PCRF 30 accesses the mapping data 31 relating the IP address of the UE 10 to the subscription identity of the user and determines the user identity token which is mapped to the subscription identity. Due to the mapping of the user identity token to the subscription identity, the determination of step 308 returns the same user identity token as the determination of step 303.

The PCRF 30 then sends a further response 309 to the AF 50. The response 309 includes the user identity token as determined at step 308. As the response 304, the further response 309 may be an AAA command of the Rx interface protocol and for example also include an authorization result with respect to the second session. The user identity token may be included in a corresponding AVP of the further response 309.

As illustrated by step 310, the AF 50 may then identify the user on the basis of the received user identity token. Since the user identity token is the same irrespective of the second IP address being different from the first IP address, the AF may determine from the user identity token that the first and the second session pertain to the same user, i.e., that the request 302 and the further request 307 are associated with the same user. This may in turn allow for maintaining user specific status information across multiple session of the same user, e.g., by maintaining status information generated during the first session for the second session. This may also allow for applying user-specific procedures, e.g., updating of a user specific counter or controlling a user-specific timer, to both the first session and the second session or more generally or sessions of the same user. For example, a user-specific timer could be started in the first session, stopped at the end of the first session, and restarted in the second session. Similarly, a user-specific counter could be updated during the first session and in the second session.

Although the process of FIG. 3 was described in relation to the PCC architecture of FIG. 2, it is to be understood that similar processes could be used in other constellations as well, e.g., in a constellation as illustrated in FIG. 1.

Figure 4:
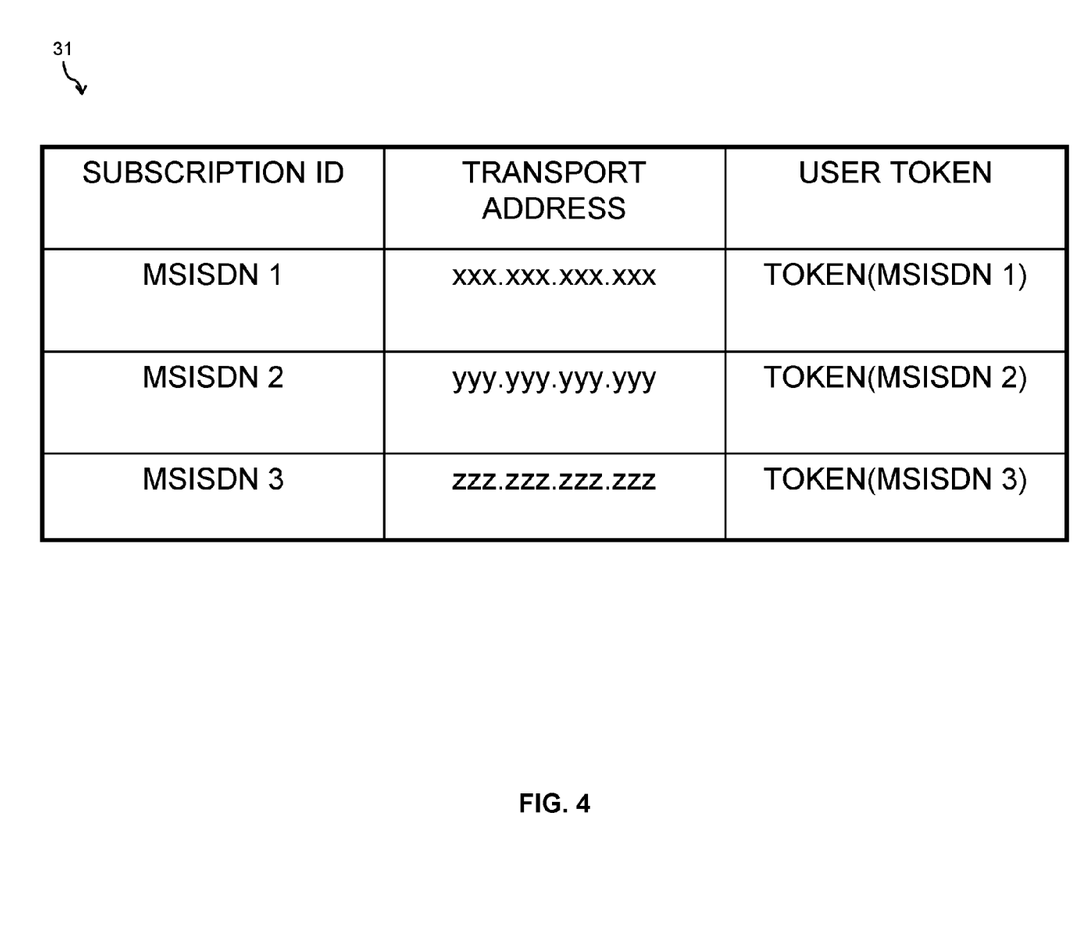
FIG. 4 shows an example of mapping data as used in an embodiment of the invention.

FIG. 4 schematically illustrates an exemplary implementation of the mapping data 31 as used in the above-described concepts. In the illustrated example, the mapping data 31 are provided in the form of a mapping table including corresponding entries for a number of subscription identities (in FIG. 4 illustrated as MSISDN 1, MSISDN 2, and MSISDN 3). For each subscription identity, the mapping table also includes the transport address (in FIG. 4 illustrated as xxx.xxx.xxx.xxx, yyy.yyy.yyy.yyy, zzz.zzz.zzz.zzz) assigned to the UE associated with the subscription identity and the user identity token (in FIG. 4 illustrated as TOKEN (MSISDN 1), TOKEN(MSISDN 2), and TOKEN(MSISDN 3)) mapped to the subscription identity. The mapping table may store the user identity tokens as alphanumeric character strings. Such alphanumeric character strings may for example be randomly generated and then stored in the mapping table. Alternatively or in addition, the mapping table may also store mapping rules for generating the user identity tokens, e.g., hash functions or parameters of hash functions. Further, it is to be understood that the mapping table could also store multiple transport addresses assigned to the same UE and associated with the same subscription identity.

Figure 5:
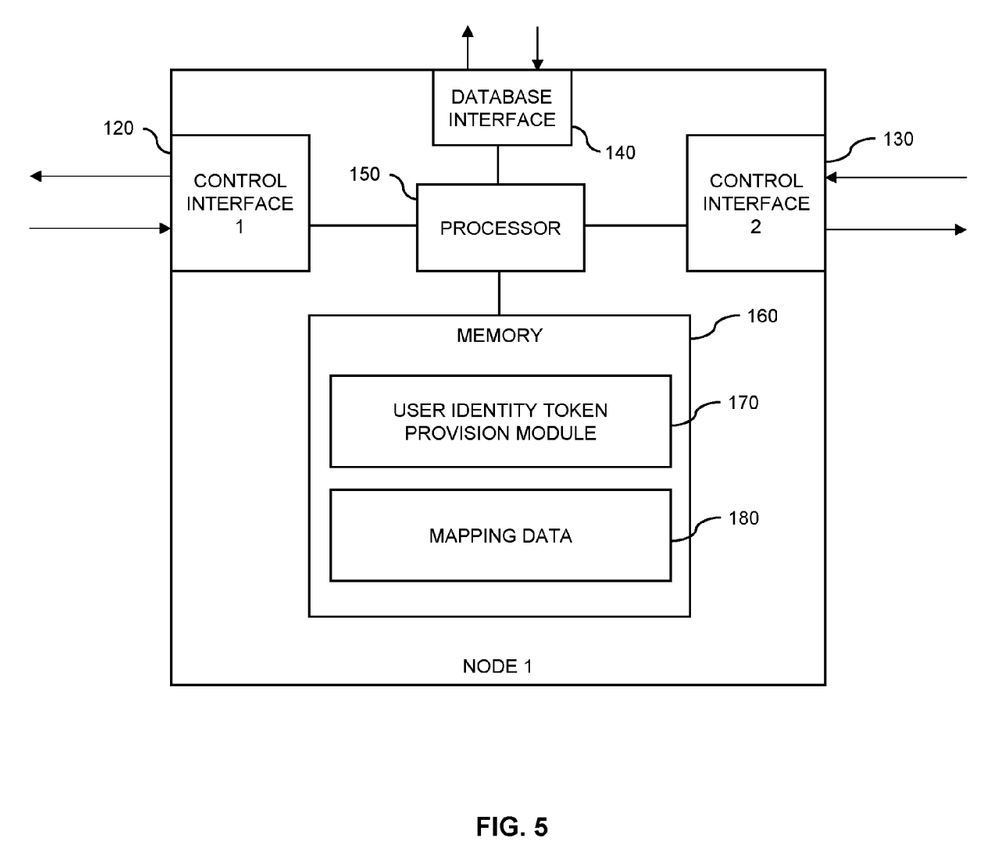
FIG. 5 schematically illustrates a node according to an embodiment of the invention.

FIG. 5 further illustrates an exemplary implementation of a communication network node. In particular, the node may correspond to the first node 13 of FIG. 1 or, more specifically, to the PCRF 30 of FIGS. 2 and 3.

In the illustrated example, the node includes a control interface 120 for communication with one or more other nodes, e.g., the second node 50 of FIG. 1, which may be the AF 50 of FIGS. 2 and 3. In addition, node may include a further control interface 130, e.g., for controlling resources of the communication network. In a 3GPP PCC architecture as illustrated in FIG. 2, the first interface 120 may correspond to the Rx interface, and the second interface 130 may correspond to the Gx interface and/or to the Gxx interface. The first interface 120 may for example be used for authorizing sessions in the communication network, e.g., resources controlled by the node 30 via the second interface 130.

Further, the node includes a processor 150 coupled to the interfaces 120, 140 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 160 includes suitably configured program code to be executed by the processor 150 so as to implement the functionalities of the first node 30 as described in connection with FIG. 1 or of the PCRF 30 as described in connection with FIGS. 2 and 3. More specifically, the memory 160 may include a user identity provision module 170 so as to implement the above-described functionalities of providing the user identity token. Further, the memory 160 may also include mapping data 180, e.g., corresponding to the above-described mapping data 31.

It is to be understood that the structure as illustrated in FIG. 5 is merely schematic and that the node may actually include further components which, for the sake of clarity, have not been illustrated, e.g., further interfaces such as an interface for accessing externally stored mapping data. Also, it is to be understood that the memory 160 may include further types of program code modules, which have not been illustrated, e.g., program code modules for implementing known functionalities of a policy controller, e.g., policy decision functionalities or the like. According to some embodiments, also a computer program product may be provided for implementing functionalities of the node, e.g., in the form of a medium storing the program code to be stored in the memory 160.

Figure 6:
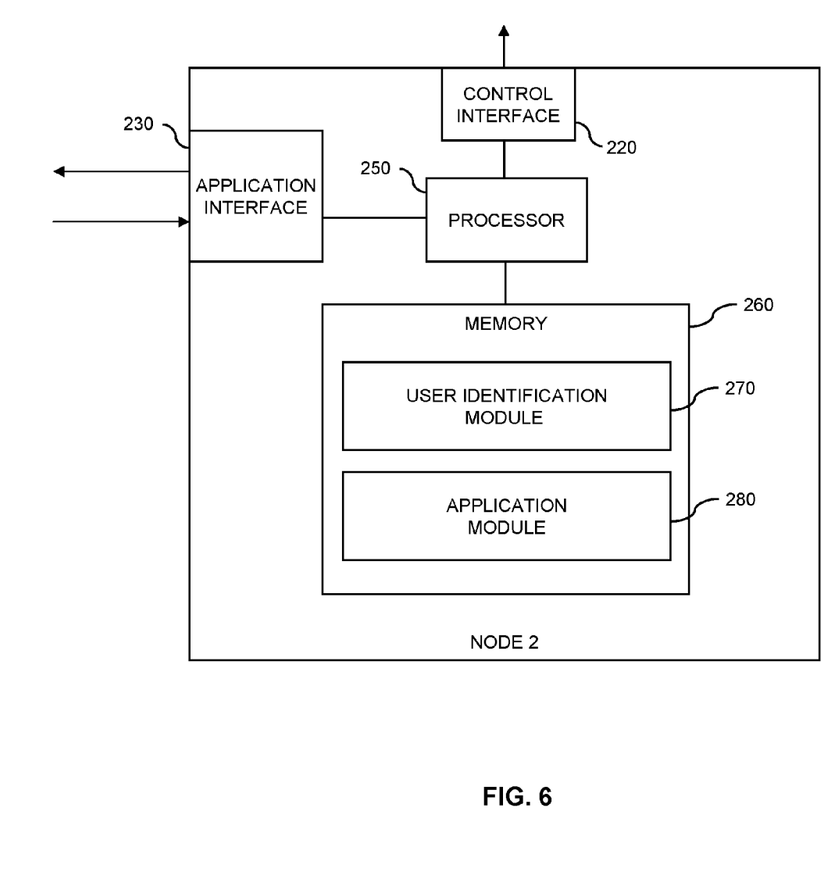
FIG. 6 schematically illustrates a further node according to an embodiment of the invention.

FIG. 6 further illustrates an exemplary implementation of a further node, e.g., for providing a certain application or service to users of a communication network. In particular, the node may correspond to the second node 15 of FIG. 1 or, more specifically, to the AF 50 of FIGS. 2 and 3.

In the illustrated example, the node includes a control interface 220 for communication with one or more other nodes, e.g., the first node 30 of FIG. 1, which may be the PCRF 30 of FIGS. 2 and 3. In addition, node may include an application interface 230, e.g., for transmitting data with respect to a UE, e.g., the UE 10. In a 3GPP PCC architecture as illustrated in FIG. 2, the control interface 220 may correspond to the Rx interface. The application interface 230 may be generally IP based and may further support various types of service specific or application specific protocols, e.g., the Session Initiation Protocol (SIP). The control interface 220 may for example be used for authorizing sessions for an application or a service in the communication network.

Further, the node includes a processor 250 coupled to the interfaces 220, 230 and a memory 260 coupled to the processor 250. The memory 260 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 260 includes suitably configured program code to be executed by the processor 250 so as to implement the functionalities of the second node 50 as described in connection with FIG. 1 or of the AF 50 as described in connection with FIGS. 2 and 3. More specifically, the memory 260 may include a user identification module 270 so as to implement the above-described functionalities of user identification on the basis of the user identity token. Further, the memory 260 may also an application module for providing functionalities of a certain application or service offered by the node to users of a communication network.

It is to be understood that the structure as illustrated in FIG. 6 is merely schematic and that the node may actually include further components which, for the sake of clarity, have not been illustrated, e.g., further interfaces. Also, it is to be understood that the memory 260 may include further types of program code modules, which have not been illustrated, e.g., program code modules for implementing functionalities of further applications or services. According to some embodiments, also a computer program product may be provided for implementing functionalities of the node, e.g., in the form of a medium storing the program code to be stored in the memory 260.

Figure 7:
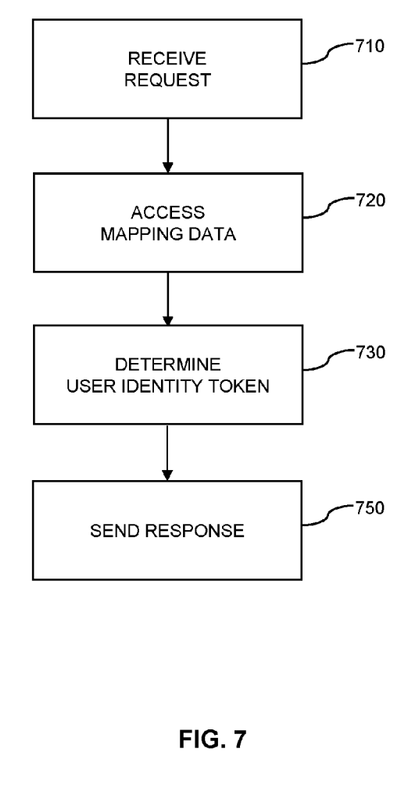
FIG. 7 shows a flowchart for illustrating a method according to an embodiment of the invention.

FIG. 7 shows a flowchart for illustrating a method for user identity handling which may be used for implementing the above described concepts in a node of a communication network. In particular, the method may be implemented by the first node 13 of FIG. 1 or the PCRF 30 of FIGS. 2 and 3.

At step 710, the node receives a request. Examples of such a request are the request 101 of FIG. 1 or one of the requests 302, 307 of FIG. 3. The request includes a transport address assigned to a user of the communication network, e.g., an IP address. The request may for example have the purpose of authorizing use of resources of the communication network for a certain service offered to the user. The request may be received from a further node which offers the service. This further node may be a third-party node, i.e., be operated by an entity which is different from the operator of the communication network. The further node may for example be an application server, e.g., implementing the AF 50 of FIGS. 2 and 3.

At step 720, the node accesses mapping data relating the transport address to a subscription identity of the user. This is done for the purpose of determining a user identity token at step 730. The user identity token is mapped to the subscription identity of the user but does not reveal the subscription identity itself, i.e., masks the subscription identity. The user identity token may for example comprise a hash value of the subscription identity and/or comprise a randomized value which is mapped to the subscription identity. The user identity token may be generated by the node, e.g., by applying a hash function to the subscription identity and/or by generating a random value, e.g., an alphanumeric character string, which is then mapped to the subscription identity.

At step 740, the node responds to the request by sending a response. Examples of such a response are the response 102 of FIG. 1 or one of the responses 304, 309 of FIG. 3. The response includes the user identity token. The response may for example include an authorization result determined by the node.

In the method of FIG. 7, privacy may be further improved by regularly replacing the user identity token mapped to the subscription identity of the user. This is may be accomplished according to a certain time schedule, e.g., once a week, once a month, or once a year. Alternatively or in addition, this may also be triggered by certain events, e.g., reception of a request to replace the user identity token or the user identity token reaching a maximum usage limit. For example, the second node 15 of FIG. 1 or the AF 50 of FIGS. 2 and 3 could determine a suitable time for replacing the user identity token, e.g., if user-specific counters or timers are reset for other reasons, and send a request for replacing the user identity token.

Figure 8:
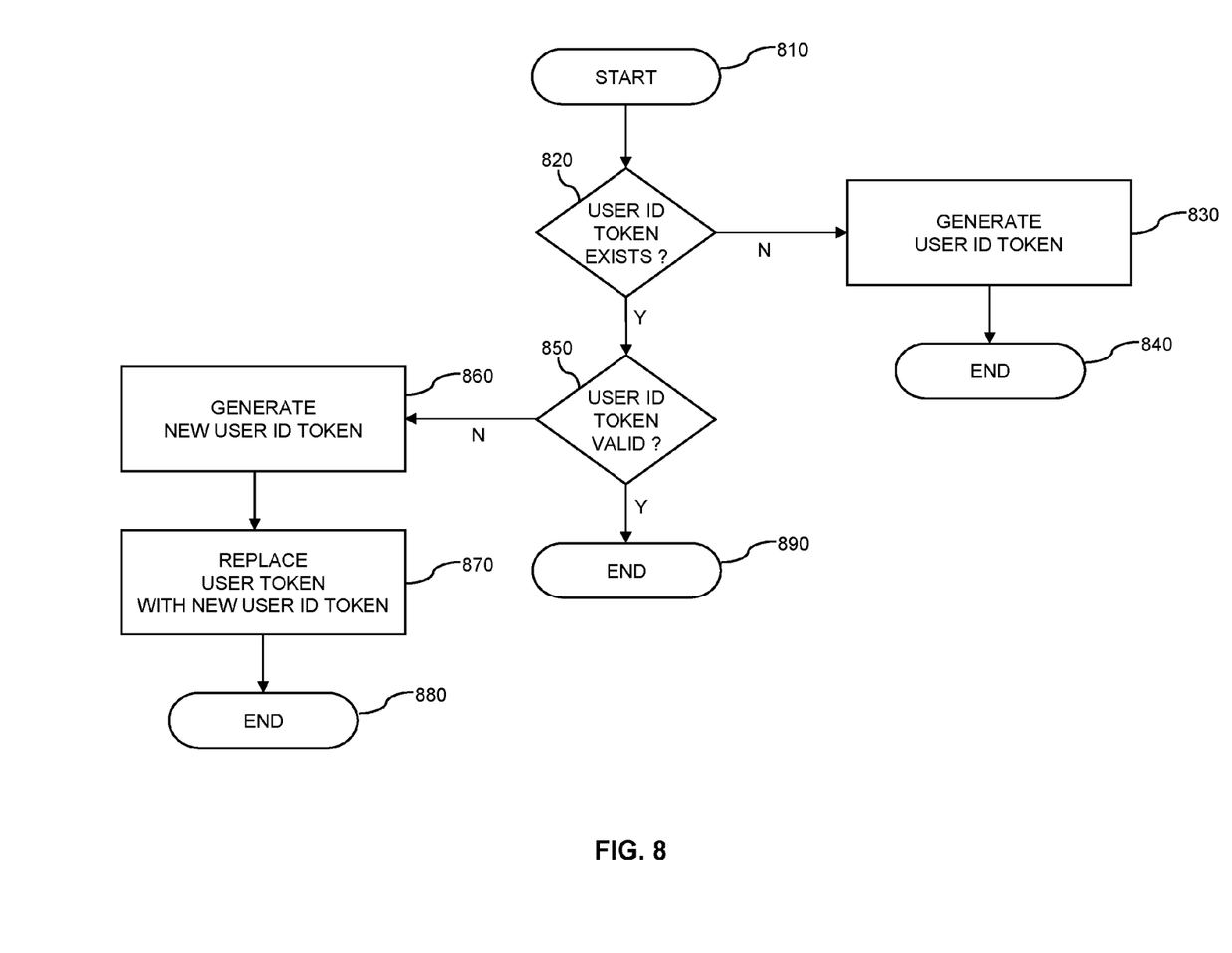
FIG. 8 shows a flowchart for illustrating a further method according to an embodiment of the invention.

FIG. 8 shows a flowchart for illustrating a method which may be used for regularly replacing the user identity token so as to improve privacy. The method may be implemented by the first node 13 of FIG. 1 or the PCRF 30 of FIGS. 2 and 3.

The method starts at step 810, e.g., due to being initiated according to a time schedule or in response to a triggering event.

At step 820, it may be checked whether a user identity token exists for a certain subscription identity. If this is the not the case, as indicated by branch "N", the method may proceed with step 830 at which the user identity token is generated. As mentioned above, this may involve applying a hash function to the subscription identity and/or generating a random value which is then mapped to the subscription identity. After generating the user identity token at step 830, the method may end at step 840.

If the determination of step 820 indicates that the user identity token exists, as indicated by branch "Y", the method may proceed with step 850. At step 850, it may be determined whether the user identity token is valid. For example, each user identity token may have an associated lifetime which can be stored together with the mapping data. If the user identity token is not valid, as indicated by branch "N", the method may proceed with step 860 at which a new user identity token is generated. As mentioned above, this may involve applying a hash function to the subscription identity and/or generating a random value which is then mapped to the subscription identity. As compared to the generation of the no longer valid user identity token another hash function or other hash function parameters may be used.

At step 870, the expired user identity token is replaced with the new user identity token as generated at step 860. That is to say, the new user identity token is mapped to the subscription identity as a replacement of the expired user identity token. The method may then end at step 880. If the determination of step 850 indicates that the user identity token is valid, as indicated by branch "Y", the method may end at step 890 without replacing the user identity token.

In the method of FIG. 8, it was assumed that the user identity token is directly mapped to the subscription identity, e.g., as an alphanumeric character string stored in association with the subscription identity. However, the user identity token could also be mapped to the subscription identity by defining a mapping rule for deriving the user identity token from the subscription identity, e.g., in the form of a hash function. In this case, steps 860 and 870 of the above method could involve determining a new mapping rule and replacing the existing mapping rule with the new mapping rule.

Further, the method of FIG. 8 could be supplemented by a procedure to inform a node using the expired user identity token for user identification of the replacement. For example, the second node 15 or the AF 50 could be informed accordingly, e.g., by providing a corresponding flag in a message transmitting a replaced or new user identity token. In this way, the node may take into account the replacement when performing user identification. In some scenarios, the node may determine that the expired user identity token and the new user identity token belong to the same user and thus ensure continuity of user identification irrespective of the replacement. For example, after the replacement the node could be provided with information linking the expired and the new user identity token to each other, e.g., by sending the new user identity token in a message which also includes the expired one. In other scenarios, the replacement may be accomplished in such a way that a node using the user identity token for user identification cannot relate the new user identity token to the expired one, e.g., in view of privacy.

Figure 9:
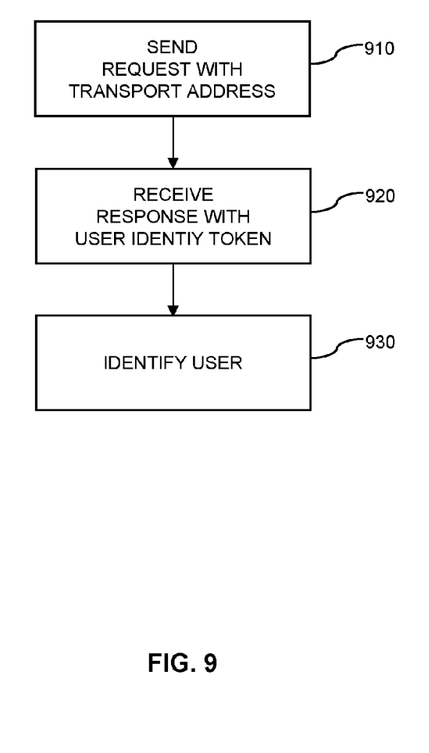
FIG. 9 shows a flowchart for illustrating a further method according to an embodiment of the invention.

FIG. 9 shows a flowchart for illustrating a method which may be used for implementing the above described concepts in a node which needs to identify a user, e.g., in an application server for providing a service in the communication network. In particular, the method may be implemented by the second node 15 of FIG. 1 or the AF 50 of FIGS. 2 and 3.

At step 910, the node sends a request. Examples of such a request are the request 101 of FIG. 1 or one of the requests 302, 307 of FIG. 3. The request includes a transport address assigned to a user of the communication network, e.g., an IP address. The request may for example have the purpose of authorizing use of resources of the communication network for a certain service offered to the user. The request may for example be sent to a policy controller of the communication network.

At step 920, the node receives a response to the request. Examples of such a response are the response 102 of FIG. 1 or one of the responses 304, 309 of FIG. 3. The response may for example include an authorization result determined in response to the request of step 910. The response includes a user identity token. The user identity token is mapped to the subscription identity of the user but does not reveal the subscription identity itself, i.e., masks the subscription identity. The user identity token may for example comprise a hash value of the subscription identity and/or comprise a randomized value which is mapped to the subscription identity.

At step 930, the node identifies the user on the basis of the user identity token. This may involve identifying network transactions, e.g., sessions, requests, or responses, which pertain to the same user. For example, the node may send a further request which includes a different transport address assigned to the user and receive a response to the further request which includes the same user identity token as the response to the request. On the basis of the responses including the same user identity token, the node may determine that the responses and also the corresponding requests are associated with the same user of the communication network. If the request is associated with a first session between the user and the node and the further request is associated with a second session between the user and the node, the node may also determine that the first session and the second session are associated with the same user. This knowledge may be utilized by the node for applying a user-specific procedure to both the first session and the second session, e.g., for providing a user specific counter or timer, or for maintaining status information of the user generated in the first session for the second session.

The methods of FIGS. 7, 8, and 9 may be combined with each other as appropriate. For example, the in a system comprising a first node and a second node, the method of FIG. 7 could be implemented by the first node, which receives the request and sends the response to the request, and the method of FIG. 9 could be implemented by the second node, which sends the request and receives the response to the request.

As can be seen, the concepts as described above may be user for providing a node with additional information on the identity of users of a communication network without compromising privacy of the users.

It is to be understood that the examples and embodiments as explained above are merely illustrative and susceptible to various modifications. For example, the concepts could be used in other types of communication networks, e.g., in a communication network using fixed access technology such as Digital Subscriber Line (DSL) or coaxial cable. Also, other types of transport addresses could be used. Further, the identification of the user by the user identity token may serve various purposes. Further, the concepts could also be used for identifying the same user in scenarios where the user makes use of multiple UEs with different assigned transport addresses. Moreover, it is to be understood that the above concepts may be implemented by using correspondingly designed software to be executed by a processor of an existing device, or by using dedicated device hardware.

The invention claimed is:

1. A method for user identity handling in a communication network, comprising:
   a node receiving a request including a transport address assigned to a user of the communication network, the request being received for a first session between the user and a further node;
   the node accessing mapping data relating the transport address to a subscription identity of the user; and
   the node determining a user identity token which is mapped to the subscription identity of the user and masks the subscription identity;
   the node responding to the request by sending a response including the user identity token;
   the node subsequently receiving a further request, the further request including a different transport address assigned to the user and being received for a subsequent, second session between the user and the further node;
   the node accessing mapping data relating the different transport address to the subscription identity of the user; and
   the node sending a further response to the further request, the further response including the user identity token, such that the further node receives the same user identity token for the user, for the first and second sessions.

2. The method according to claim 1, comprising:
   the node regularly replacing the user identity token which is mapped to the subscription identity.

3. The method according to claim 1, wherein the node is a policy controller of the communication network.

4. The method according to claim 3, wherein the further node comprises an application server providing a service in the communication network.

5. The method according to claim 1, wherein the user identity token comprises a hash value of the subscription identity.

6. The method according to claim 1, wherein the user identity token comprises a randomized value which is mapped to the subscription identity.

7. A method for identifying a user of a communication network, comprising:
   a node sending a request including a transport address assigned to a user of the communication network, the request being sent for a first session between the node and the user;
   the node receiving a response to the request, the response including a user identity token which is mapped to a subscription identity of the user and masks the subscription identity;
   the node subsequently sending a further request, the further request including a different transport address assigned to the user, the further request being sent for a second session between the node and the user;
   the node receiving a further response to the further request, the further response including the user identity token; and
   the node determining on the basis of the user identity token that the request and the further request are associated with the same user of the communication network;
   wherein the node uses the user identity token to maintain user-specific information for the user that is common to both the first and second sessions.

8. The method according to claim 7,
   wherein the node applies a user-specific procedure to both the first session and the second session.

9. The method according to claim 7, wherein the user identity token comprises a hash value of the subscription identity.

10. The method according to claim 7, wherein the user identity token comprises a randomized value which is mapped to the subscription identity.

11. The method according to claim 7,
    wherein the node is an application server for providing a service in the communication network, and
    wherein the request is sent to a policy controller of the communication network.

12. A node, comprising:
    an interface for communication with at least one further node; and
    a processor configured to:
       receive, via said interface, a request including a transport address assigned to a user of a communication network the request being received for a first session between the user and the further node,
       access mapping data relating the transport address to a subscription identity of the user, determine a user identity token which is mapped to the subscription identity of the user and masks the subscription identity,
send, via said interface, a response to the request, said response including the user identity token,
subsequently receive a further request, the further request including a different transport address assigned to the user and being received for a second subsequent session between the user and the further node;
access mapping data relating the different transport address to the subscription identity of the user, and
send a further response to the further request, the further response including the user identity token, such that the further node receives the same user identity token for the user, for the first and second sessions.

13. A node, comprising:
an interface for communication with one or more other nodes of a communication network; and
a processor configured to:
send, via said interface, a request including a transport address assigned to a user of the communication network, the first request being sent for a first session between the user and the node,
receive, via said interface, a response to the request, said response including a user identity token which is mapped to a subscription identity of the user and masks the subscription identity,
send, via said interface, a subsequent, further request, said further request including a different transport address assigned to the user and being sent for a second session between the user and the node,
receive, via said interface, a further response to the further request, the response including the user identity token, and
determine, on the basis of the user identity token, that the request and the further request are associated with the same user of the communication network;
wherein the node uses the user identity token to maintain user-specific information for the user that is common to both the first and second sessions.

14. A system, comprising:
a first node and a second node, the first node being associated with a communication network used by a user to access the second node, and wherein the second node communicates with the user via the communication network;
wherein the first node is configured to:
receive a request from the second node, said request associated with a first session between the user and the second node and including a transport address assigned to the user for communicating with the user via the communication network,
access mapping data relating the transport address to a subscription identity of the user,
determine a user identity token which is mapped to the subscription identity of the user and masks the subscription identity, and
send a response including the user identity token to the second node;
wherein the first node is further configured to:
subsequently receive a further request from the second node, the further request associated with a second session between the user and the second node and including a different transport address assigned to the user,
access mapping data relating the different transport address to the subscription identity of the user,
determine the user identity token which is mapped to the subscription identity of the user, and
send a further response including the user identity token to the second node; and
wherein the second node is configured to receive the response and the further response and to determine on the basis of the user identity token in the response and the further response that the request and the further request are associated with the same user of the communication network, and to use the user identity token to maintain user-specific information for the user that is common to both the first and second sessions.

15. The system according to claim 14,
wherein the second node applies a user-specific procedure to both the first session and the second session.

16. The system according to claim 14, comprising:
wherein the first node is configured to regularly replace the user identity token which is mapped to the subscription identity.

17. The system according to claim 14, wherein first the node is a policy controller of the communication network.

18. The system according to claim 14, wherein the second node is an application server for providing a service in the communication network.

19. The system according to claim 14, wherein the user identity token comprises a hash value of the subscription identity.

20. The system according to claim 14, wherein the user identity token comprises a randomized value which is mapped to the subscription identity.

* * * * *